(12) United States Patent
Parkison et al.

(10) Patent No.: US 8,364,920 B1
(45) Date of Patent: Jan. 29, 2013

(54) SYSTEM AND METHOD FOR TRANSFERRING AND BACKING UP LUNS AND LUN CLONES ON PRIMARY AND SECONDARY SERVERS

(75) Inventors: Brian Parkison, Santa Cruz, CA (US); Stephen Wu, Rancho Cordova, CA (US); Alan Driscoll, Freemont, CA (US); Vikas Yadav, Santa Clara, CA (US); David Minnich, Hillsborough, NC (US); Rithin Shetty, Mountain View, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 265 days.

(21) Appl. No.: 12/418,769

(22) Filed: Apr. 6, 2009

(51) Int. Cl.
*G06F 12/00* (2006.01)

(52) U.S. Cl. .......................... 711/162; 711/161; 711/203

(58) Field of Classification Search .................. 711/114, 711/162, 170, 161, 203
See application file for complete search history.

(56) References Cited

U.S. PATENT DOCUMENTS

| 6,915,316 | B1 * | 7/2005 | Patterson et al. ...................... 1/1 |
| 2007/0186001 | A1 * | 8/2007 | Wayda et al. ................. 709/230 |
| 2008/0005468 | A1 * | 1/2008 | Faibish et al. ................. 711/114 |

* cited by examiner

*Primary Examiner* — Yong Choe
(74) *Attorney, Agent, or Firm* — Blakely, Sokoloff, Taylor & Zafman LLP (57) ABSTRACT

Lun clones are transferred from a primary server to a secondary server. The lun clones on the secondary server maintain the same data storage space saving relationship with backing luns of the lun clones as exists on the primary server. Incremental backups and restores of the lun clones between the primary and secondary servers involves transferring less than the total number of data blocks associated with the lun clone.

18 Claims, 7 Drawing Sheets

SYSTEM AND METHOD FOR TRANSFERRING AND BACKING UP LUNS AND LUN CLONES ON PRIMARY AND SECONDARY SERVERS

The present invention relates to backing up data on data storage servers. More particularly, the present invention relates to a new and improved data storage server and method for backing up luns and lun clones from a primary server to a secondary server while maintaining the space savings of the lun and lun clone relationship.

BACKGROUND OF THE INVENTION

A data storage server ("server") is connected to physical data storage devices such as magnetic or solid state disk drives ("drives") on which data is actually stored. The available data storage space of the drives is divided into one or more volumes by the server. A volume is a logical data storage container in which files can be stored. Each volume has an active filesystem which determines how the files are stored, accessed and modified, amongst other things. A persistent point in time image ("PPI") of the active filesystem is called a snapshot. The creation of a snapshot does not typically involve the copying of any significant amount of data, but rather involves copying a very small amount of metadata of the active filesystem. Multiple snapshots and the active filesystem may share many of the same files and data blocks which make up those files.

Special files called virtual disks ("vdisks") are created within a volume and are managed by the server. Some embodiments of vdisks may involve vdisks which are not based on a single file. Client computers can connect to the vdisks over a communications network using predefined protocols. Once the clients connect to the vdisks the clients can write data to and read data from the vdisks in the same manner as the clients can write data to and read data from locally attached drives. Vdisks are generally one of two different types, either Logical Unit Numbers ("luns") or lun clones. A lun clone is a space saving copy of a lun and may share data blocks with the lun. The lun of which the lun clone is a space saving copy of is referred to as a backing lun. The only luns which may be backing luns are those luns within snapshots. The snapshot which contains a backing lun for a particular lun clone is referred to as the backing snapshot of that lun clone. When the lun clone is first created, the backing lun and the lun clone both share the same data blocks. The creation of a lun clone is an almost instantaneous process since the data blocks of the backing lun are not copied. Over time, as the lun clone is modified, the number of shared data blocks between the backing lun and the lun clone diminishes. Lun clones are very useful in situations where testing of data stored on a lun is desired without permanently modifying that data. For instance, a software application may be stored on the lun and used in a production environment. If it is desired to test an upgrade of the software application without disrupting the lun, a snapshot is created which contains the lun and a lun clone is created based on the lun within the snapshot. The software application can then be upgraded and tested on the lun clone without affecting the lun. The lun clone may then be deleted after the software upgrade has been verified to be problem free.

To protect against inadvertent data loss on the server, the data on the server may be backed up to another server. A server which backs up data to another server is referred to as a primary server and the server which stores the backed up data for the primary server is referred to as a secondary server. Luns on the primary server are preserved in a consistent state by creating a snapshot of the active filesystem, and then transferring the snapshot from the primary server to the secondary server. Of course, transferring an object in a computer context does not imply that the object transferred is deleted or otherwise removed from its source location, as in a physical context. The secondary server receives the transferred snapshot, restores the snapshot into the active filesystem and then creates a snapshot of the active filesystem in order to preserve the state of the active filesystem. In the event that data is inadvertently lost on the primary server, the data can be restored on the primary server by transferring the previously backed up snapshot from the secondary server to the primary server, and then restoring the transferred snapshot to the active filesystem.

Figure 1:
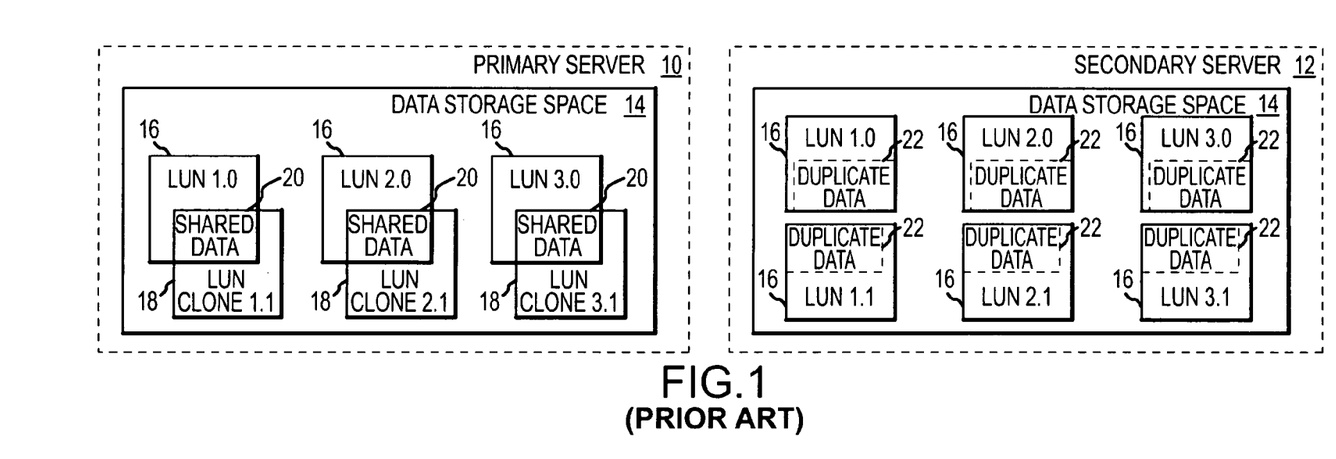
FIG. 1 is a diagrammatic illustration of snapshots which have been transferred from a primary server to a secondary server using previously known techniques.

Previously known techniques for backing up lun clones from a primary server to a secondary server did not preserve the space saving relationship between luns and lun clones on the secondary server, as shown in FIG. 1. A primary server 10 and a secondary server 12 each have a data storage space 14 which stores data for luns 16 and luns clones 18. Each lun clone 18 on the primary server 10 contains shared data 20 which is shared with a corresponding lun 16. The previous techniques for backing up the lun clones 18 resulted in the data of lun clones 18 (labeled as Lun Clones 1.1, 2.1 and 3.1) being copied into luns 16 (labeled as Lun 1.1, 2.1 and 3.1) on the secondary server 12. Since the lun clones 18 (Lun clones 1.1, 2.1 and 3.1) were copied to the secondary server 12 as luns 16 (Luns 1.1, 2.1 and 3.1), the space saving relationship between the lun clones 18 and the luns 16 was lost. The shared data 20 on the primary server 10 that is shared between the lun clones 18 and the luns 16 became duplicate data 22 on the secondary server, with both the luns 16 (Luns 1.0, 2.0 and 3.0) and the luns 16 (Luns 1.1, 2.1 and 3.1) having separate copies of the duplicate data 22. As a result of the luns 16 on the secondary server 12 having duplicate data 22, more data storage space 14 on the secondary server 12 was required than on the primary server 10 to backup the data from the luns 16 and the lun clones 18 of the primary server 10.

These and other considerations have led to the evolution of the present invention.

SUMMARY OF THE INVENTION

The present invention relates to transferring lun clones as lun clones between a primary server and a secondary server. The same space saving relationship between the lun clones and the backing luns of the lun clones which exists on the primary server is maintained on the secondary server. By maintaining the same space saving relationship between the primary and secondary servers, less data storage space is required on the secondary server to backup the lun clones. Additionally, only those data blocks of the lun clones which are not shared with the backing luns are transferred between the primary and secondary servers during backups and restores of the lun clones. The space savings on the secondary server and the reduced amount of data transferred between the primary and secondary servers results in a cost savings compared to previous techniques for transferring lun clones between the primary and secondary servers.

One aspect of the invention involves a method of transferring a lun clone and its backing lun from a primary server to a secondary server. A first snapshot containing the backing lun is transferred to the secondary server. A second snapshot is created of the lun clone on the primary server and the second snapshot is then transferred to the secondary server. The secondary server creates a new backing lun in the active filesystem from the data of the backing lun in the transferred first snapshot. The secondary server then creates a third snapshot which captures the new backing lun. The secondary server creates a new lun clone in the active filesystem based off of the new backing lun captured in the third snapshot. The secondary server then updates the new lun clone from the lun clone contained in the transferred second snapshot.

Another aspect of the invention involves a method of restoring a restore snapshot from a secondary server to a primary server. A base snapshot existing on both servers is selected and restored to a filesystem on the primary server. The secondary server transfers to the primary server the differences between the restore snapshot and the base snapshot. The primary server incorporates the transferred differences into the active filesystem.

Another aspect of the invention involves a computer system. The computer system includes first and second computers and a communications network. The first and second computers are operative to create lun clones of backing luns captured within persistent point in time images. The first computer backs up a lun clone to the second computer by transferring data blocks of the backing lun of the lun clone, the second computer creates a copy of the backing lun from the transferred data blocks and then creates a persistent point in time image which includes the backing lun copy, the first computer determines the non-common data blocks in the lun clone but not the backing file and sends the non-common data blocks to the second computer, the second computer creates a lun clone copy based on the backing lun copy within the persistent point in time image and then updates the lun clone copy with the transferred non-common data blocks.

Yet another aspect of the present invention involves a method of conserving data storage space on a second data storage computer. A source lun and a source lun clone on a first data storage computer have a data storage space saving relationship. Data from the source lun and the source lun clone of the first data storage computer is transferred to the second data storage computer. The transferred data is backed up on the second data storage computer in a target lun and a target lun clone which have a data storage space saving relationship which duplicates the data storage space saving relationship of the source lun and the source lun clone.

Subsidiary aspects of the invention include maintaining mappings between file identification information on a first server and file identification information on a second server, maintaining mappings between snapshot identification information on a first server and snapshot identification information on a second server, replacing metadata information of files on a primary server with metadata information transferred from a secondary server, and dynamically converting between luns and lun clones.

A more complete appreciation of the present invention and its scope may be obtained from the accompanying drawings, which are briefly summarized below, from the following detailed description of a presently preferred embodiment of the invention, and from the appended claims.

DETAILED DESCRIPTION

Figure 2:
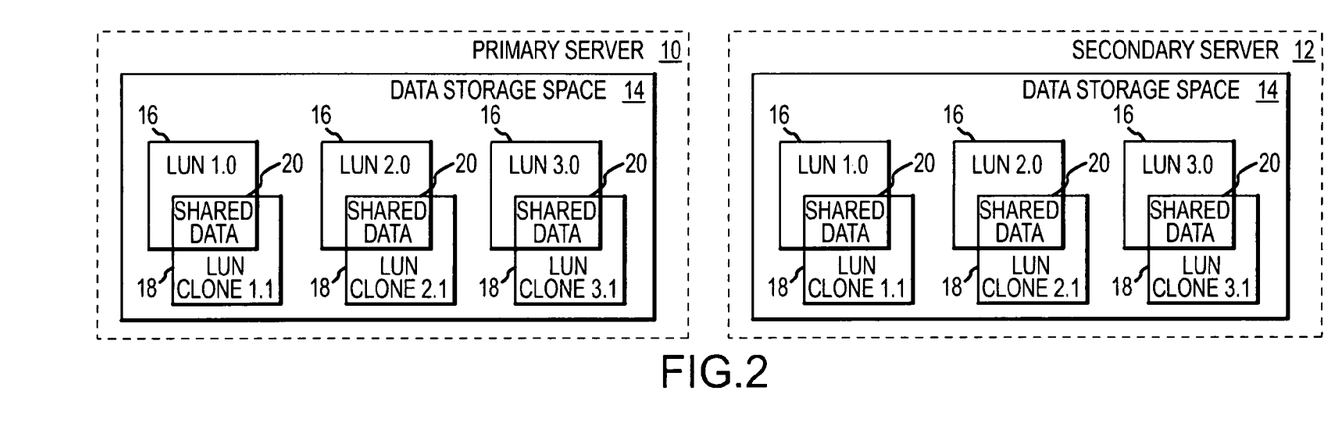
FIG. 2 is a diagrammatic illustration of snapshots which have been transferred from a primary server to a secondary server in accordance with the present invention.

A primary server 10 and secondary server 12 which implement the present invention are shown in FIG. 2. Each of the primary and secondary servers 10 and 12 has a data storage space 14 in which luns 16 and lun clones 18 are stored. Each lun clone 18 on the primary server 10 contains shared data 20 which is shared with a corresponding lun 16. A significant advantage of the present invention involves transferring lun clones 18 as lun clones 18 between the primary and secondary servers 10 and 12. Since the lun clones 18 are transferred as lun clones 18 during a backup of the lun clones 18 from the primary server 10 to the secondary server 12, the space saving relationship between the lun clones 18 and the luns 16 is maintained. Maintaining the space saving relationship between the luns 16 and the lun clones 18 on the secondary server 12 results in a cost savings since less data storage space 14 is required to backup the luns 16 and lun clones 18 of the primary server 10 compared to the prior art (FIG. 1), and less network bandwidth is required to transfer the lun clones 18 between the servers 10 and 12.

Figure 3:
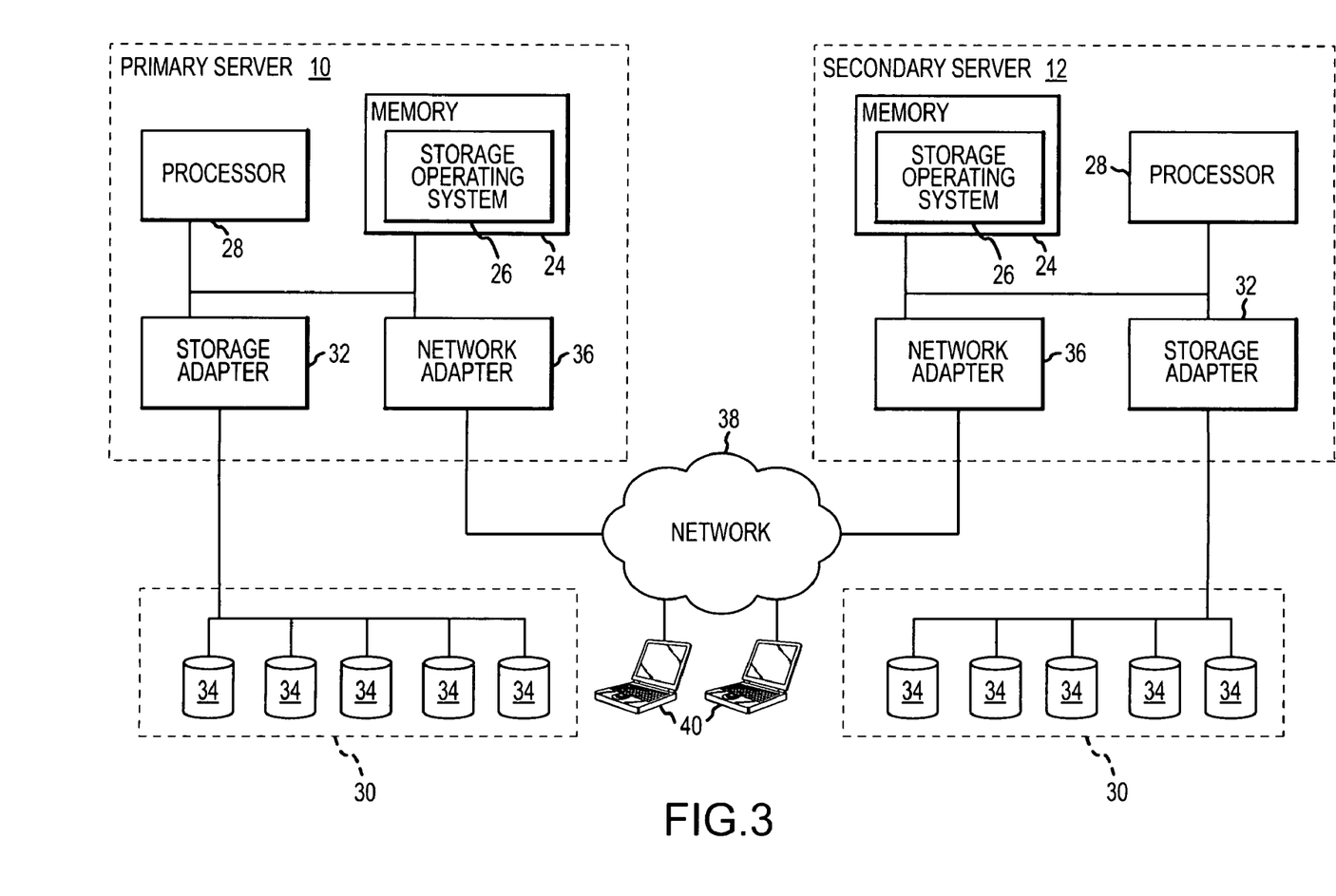
FIG. 3 is a diagrammatic illustration of select internal components of the primary server and a secondary servers shown in FIG. 2, in addition to client computers which access the primary and secondary servers over a network.

The primary server 10 and the secondary server 12 each have a memory 24 which stores a storage operating system 26, as shown in FIG. 3. Each server 10 and 12 has a processor 28 which executes the storage operating system 26. The storage operating system 26 generally controls the flow of data through the various components of the respective servers 10 and 12. Other embodiments of the present invention may include software other than an operating system or may include multiple software components which interact with one another to implement the present invention. A disk subsystem 30 is connected to a storage adapter 32 of each server 10 and 12. Each disk subsystem 30 contains a plurality of data storage devices ("drives") 34, such as magnetic or solid state drives on which data is stored by the servers 10 and 12. Each of the servers 10 and 12 contains a network adapter 36 which is further connected to a network 38. The servers 10 and 12 communicate with each other and with client computers 40 over the network 38.

Figure 4:
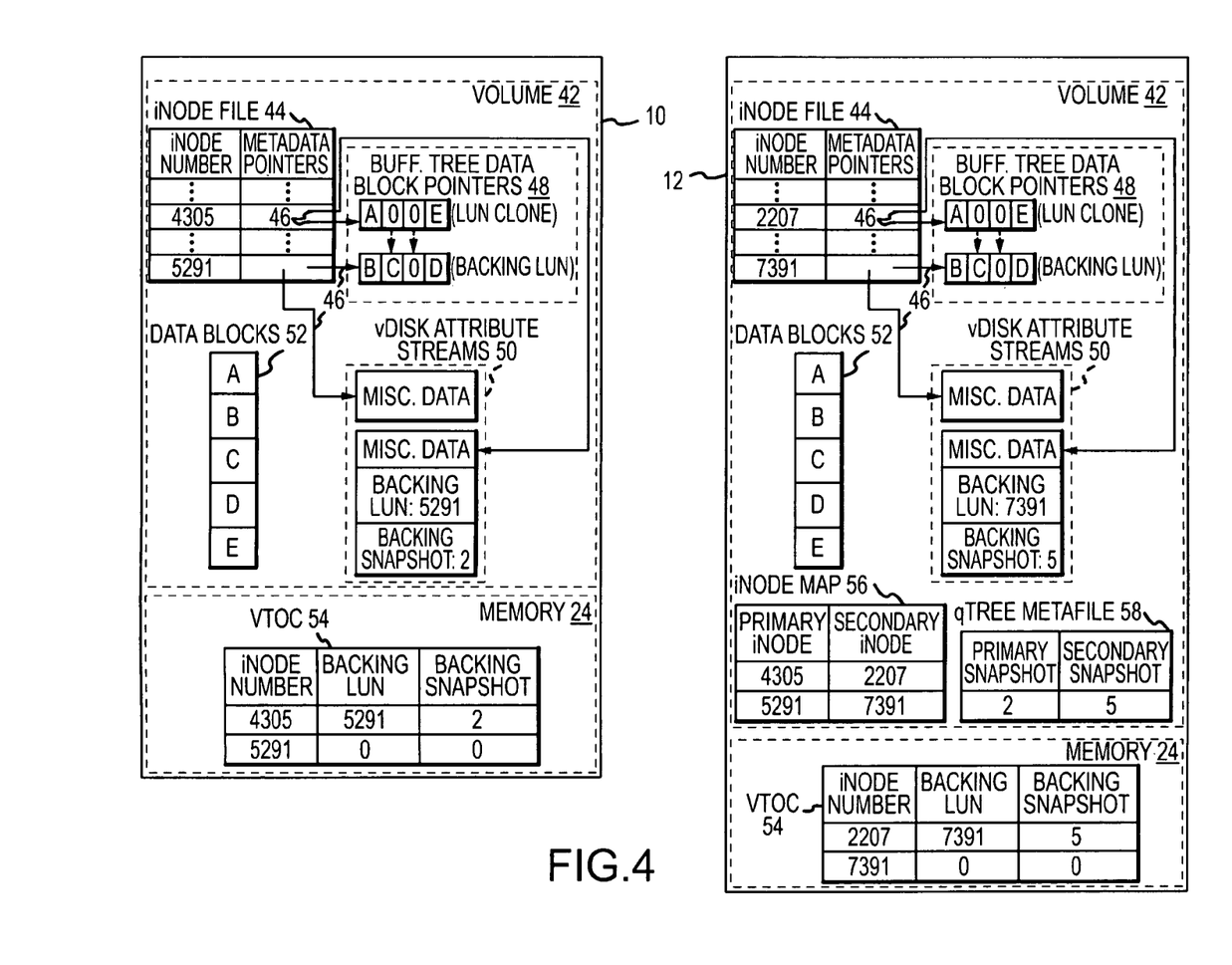
FIG. 4 is a diagrammatic illustration of volume and memory contents on both the primary and secondary servers shown in FIG. 2, along with representations of select data structures.

The data storage space supplied by the disk subsystems 30 to the servers 10 and 12 is formatted by the servers 10 and 12 into one or more discrete logical volumes. Exemplary volumes 42 within the primary and secondary servers 10 and 12 are shown in FIG. 4. Within each of the volumes 42 is an inode file 44. The inode file 44 correlates a unique number to each file within the volume 42, this number being referred to as an inode number. Two different exemplary inode numbers, 4305 and 5291 are shown in the inode file 44 on the primary server 10. The inode file 44 may contain different types of metadata related to files in different embodiments of a volume 42, and is shown as containing metadata pointers 46 which point to buffer tree data block pointers ("data block pointers") 48 and vdisk attribute streams 50. In this scenario, inode numbers 4305 and 5291 both correspond to vdisks.

The storage operating system 26 (FIG. 3) determines whether a particular vdisk is a lun or a lun clone by reading the vdisk attribute stream 50 associated with that vdisk. If the vdisk attribute stream contains backing lun and backing snapshot information, then the vdisk corresponding to that vdisk attribute stream is a lun clone. Thus, the vdisk corresponding to inode number 4305 is a lun clone because its entry in the inode file 44 contains a metadata pointer 46 which points to the vdisk attribute stream 50 which contains a backing lun number of 5291 and a backing snapshot number of 2. Similarly, the vdisk corresponding to inode number 5291 is a lun instead of a lun clone because its entry in the inode file 44 contains a metadata pointer 46 which points to the vdisk attribute stream 50 which does not contain any backing lun or backing snapshot information.

The data block pointers 48 define which data blocks 52 are associated with each vdisk. Each of the data block pointers 48 is either initialized and points to a specific one of the data blocks 52 or is uninitialized. The data block pointers 48 which are initialized are shown as containing one of the letters A, B, C, D or E in order to indicate that those data block pointers 48 point to the corresponding one of the data blocks 52 which are labeled A, B, C, D or E. The data block pointers containing the number 0 indicate that those data block pointers 48 are uninitialized. The consequence of a data block pointer 48 being uninitialized is different depending on whether the particular vdisk corresponding to the data block pointer 48 is a lun 16 or a lun clone 18 (FIG. 2).

The storage operating system 26 (FIG. 3) interprets an uninitialized data block pointer 48 of a lun 16 (FIG. 2) as implicitly pointing to a data block containing all zeros. In other words, when reading a file, the storage operating system 26 traverses the data block pointers 48 corresponding to that file in order to determine which data blocks 52 belong to the file so that the storage operating system 26 can then read those data blocks 52 and write them to the memory 24 (FIG. 3). When the storage operating system 26 encounters an uninitialized data block pointer 48 in the course of traversing the data block pointers 48 associated with a lun 16, the storage operating system writes a data block containing all zeros to the memory 24 instead of copying an actual data block 52 containing all zeros from the volume 42. This feature saves space on the volume 42 since data blocks 52 which contain all zeros do not have to be written to the volume 42. Zero filled data blocks of a file are referred to as holes, since there is not an actual data block 52 containing the zeros within the volume 42.

The storage operating system 26 (FIG. 3) interprets an uninitialized data block pointer 46 of a lun clone 18 (FIG. 2) as impliedly pointing to the data block 52 pointed to by the data block pointers 48 of the backing lun at the same offset. For example, four data block pointers 48 are shown associated with the lun clone having inode number 4305. The first data block pointer 48 points to the data block 52 designated with the letter A. The second data block pointer 48 is uninitialized, therefore the storage operating system 26 reads the data block pointer 48 at the same offset (the offset in this case being two, since this is the second data block pointer 48 for the lun clone) corresponding to the backing lun. The backing lun is the lun having inode number 5291 and the data block pointer 48 corresponding to the second offset points to the data block 48 designated by the letter C. Thus, the storage operating system determines the second data block 52 of the lun clone with inode number 4305 to be the data block 52 designated by the letter C. Similarly, the third data block pointer 48 for the lun clone is uninitialized. Upon determining that the third data block pointer 48 is uninitialized, the storage operating system reads the data block pointer 48 at the third offset of the backing lun and discovers that this data block pointer 48 is also uninitialized (as shown by the third data block pointers 48 corresponding to both inode numbers 4305 and 5291 containing the number 0). The storage operating system 26 then determines that the third data block 52 of the lun clone having inode number 4305 is a zero filled data block. The data block pointer 48 at the fourth offset for this lun clone points to the data block 52 designated by the letter E. Thus, the data blocks 52 associated with the lun clone having inode number 4305 are: the data block 52 designated by the letter A, followed by the data block 52 designated by the letter C, followed by a zero-filled data block, followed by the data block 52 designated by the letter E. Note that there is only one copy of the data block 52 designated by the letter C, yet that data block is associated with both the lun and lun clone. This relationship between the lun and lun clone is therefore referred to as a data storage space saving relationship since only one copy is needed of data blocks which are shared or associated with both the lun and the lun clone.

The memory 24 of primary server 10 contains a vdisk table of contents ("vtoc") 54. The vtoc 54 is a data structure which contains information associating inode numbers of vdisks with backing lun and backing snapshot information. If a particular vdisk is a lun, then the backing lun and backing snapshot information corresponding to that vdisk is zero, as shown in the vtoc 54 for the vdisk corresponding to inode number 5291. If a particular vdisk is a lun clone, then the backing lun information corresponding to that vdisk is the inode number of the backing lun for that lun clone and the backing snapshot information corresponding to that vdisk is the snapshot id that contains the backing lun, as shown in the vtoc 54 for the vdisk corresponding to inode number 4305. Since the vtoc 54 is stored in the memory 24, the storage operating system 26 (FIG. 3) can determine the backing lun and backing snapshot of a particular vdisk or lun clone much faster than the storage operating system 26 could make that determination if the storage operating system 26 had to read the vdisk attribute streams 50 from the volume 42 on the primary server 10.

The volume 42 and the memory 24 of the secondary server 12 are similar to the volume 42 and the memory 24 of the primary server 10. The inode file 44 of the volume 42 on the secondary server 12 contains entries for a lun clone and a lun having exemplary inode numbers of 2207 and 7391, respectively. The lun clone and lun corresponding to inode numbers 2207 and 7391 are copies of the lun clone and lun corresponding to inode numbers 4305 and 5291 on the primary server 10. Thus, it is presumed that FIG. 4 represents a point in time after the lun and lun clone having inode numbers 4305 and 5291 were backed up to the secondary server 12. Also on the volume 42 of the secondary server 12 is an inode map 56 and a qtree metafile 58. The inode map 56 correlates inodes of files between the primary and secondary servers 10 and 12. Likewise, the qtree metafile 58 correlates snapshot ids between the primary and secondary servers 10 and 12. The lun and lun clone having inode numbers 2207 and 7391 on the secondary server 12 have the same data storage space saving relationship as do the lun and lun clone having inode numbers 4305 and 5291 on the primary server 10.

A high level overview of an exemplary restore is pictorially shown in FIG. 5 and described below. A primary server 10 and a secondary server 12 are presumed to each have a single volume for the sake of brevity, it being understood that snapshots, luns and lun clones reside within these volumes on the respective servers 10 and 12. On both the primary and secondary servers 10 and 12 is a backing snapshot 60 and a base snapshot 62. Also on the secondary server 12 is a restore snapshot 64. All of the snapshots 60, 62 and 64 on the secondary server 12 were previously transferred from the primary server 10 to the secondary server 12. Within each snapshot 60, 62, 64 is a qtree 66. The qtrees 66 are directory structures which contain files, such as luns 16 and lun clones 18. The snapshots 60, 62 and 64 are persistent point in time images of an active filesystem 68 on the primary server 10, each created at a point in time earlier than the point in time represented by FIG. 5. The base snapshot 62 was originally created on the primary server 10 at a point in time after the creation of the backing snapshot 60. The restore snapshot 64 was originally created on the primary server 10 at a point in time after the creation of the base snapshot 62.

The backing snapshot 60 is the first snapshot to have been transferred from the primary server 10 to the secondary server 12. One of the consequences of the backing snapshot 60 being the first snapshot to have been transferred to the secondary server 12 is that any lun clones 18 which may have been in the backing snapshot 60 on the primary server 10 are not transferred to the secondary server with the transfer of the backing snapshot 60. Lun clones require backing luns within backing snapshots in this embodiment, and since no snapshot exists on the secondary server 12 prior to the transfer of the backing snapshot 60, there is no snapshot which could be a backing snapshot for any lun clones in the backing snapshot 60 on the secondary server 12. When the backing snapshot 60 was transferred from the primary server 10 to the secondary server 12, the luns 16 labeled Lun 1.0 and 2.0 were copied to the active filesystem (not shown) of the secondary server, the inode map 56 (FIG. 4) was updated with the mapping between the inode numbers for each of the luns 16 on the primary server 10 and the inode numbers assigned to the new luns 16 written to the active filesystem on the secondary server, a snapshot of the active filesystem on the secondary server 12 was created, and the qtree metafile 58 (FIG. 3) was updated with the mapping between the snapshot id of the backing snapshot 60 received from the primary server 10 and the snapshot id assigned to the new snapshot of the active filesystem, which became the backing snapshot 60 on the secondary server 12.

The base snapshot 62 was the second snapshot to have been transferred from the primary server 10 to the secondary server 12. The base snapshot 62 contains a lun 16 labeled Lun 1.1 which is a later in time version of the Lun 1.0 in the backing snapshot 60. The base snapshot 62 also contains a lun clone 18 labeled Lun Clone 2.1. The lun clone 18 labeled Lun Clone 2.1 is a lun clone of the lun 16 labeled Lun 2.0. It is irrelevant whether or not the lun 2.0 still exists in the active filesystem of the primary server 10 at the time the base snapshot is created and is therefore not shown in the base snapshot 62. The inode map 56 and the qtree metafile 58 (FIG. 3) were updated after the transfer of the base snapshot 62 similarly to the way they were updated as described above for the backing snapshot 60.

The restore snapshot 64 on the secondary server 12 was the third snapshot to have been transferred from the primary server 10 to the secondary server 12. There is no restore snapshot 64 on the primary server 10 at the point in time represented by FIG. 5 because the restore snapshot 64 is presumed to have been deleted from the primary server 10 some time after the restore snapshot 64 was transferred to the secondary server 12. The restore snapshot 64 contains a lun 16 labeled Lun 1.2 which is a later in time version of the lun 16 labeled Lun 1.1 in the base snapshot 62. The lun 16 labeled Split Lun 2.2 in the restore snapshot 64 is a version of the lun clone 18 labeled Lun Clone 2.1 in the base snapshot 62 after the Lun Clone 2.1 was split from its backing lun. The process of splitting a lun clone from its backing lun results in the lun clone becoming what is known as a split lun, and the space saving relationship the lun clone had with the backing lun is severed. The process of splitting a lun clone from its backing lun is known in the art. The inode map 56 and the qtree metafile 58 (FIG. 3) were updated after the transfer of the restore snapshot 64 similarly to the way they were updated as described above for the backing snapshot 60.

A restore of the restore snapshot 64 from the secondary server 12 to the active filesystem 68 of the primary server 10 initially involves determining which, if any, previously transferred snapshots still exist on both the primary and secondary servers 10 and 12. Such a previously transferred snapshot is referred to as a base snapshot, and the base snapshot 62 is such a snapshot. The active filesystem 68 of the primary server 10 is then rolled back to the base snapshot 62 using the copy of the base snapshot 62 that exists on the primary server 10. The vdisks of the base snapshot 62 typically have some data blocks in common with the vdisks of the restore snapshot 64, such data blocks being referred to as common data blocks 70. The data blocks of the vdisks within the restore snapshot 64 which are not present on the primary server are referred to as non-common data blocks 72. The secondary server 12 sends to the primary server 10 the non-common data blocks 72 and other information as part of the restore of the restore snapshot 64. The primary server 10 then replaces certain data blocks of the vdisks within the active filesystem 68 corresponding to the received non-common data blocks 72, as well as performs other actions described more fully below so that the vdisks of the restore snapshot 64 are fully restored into the active filesystem 68 of the primary server 10.

Figure 5:
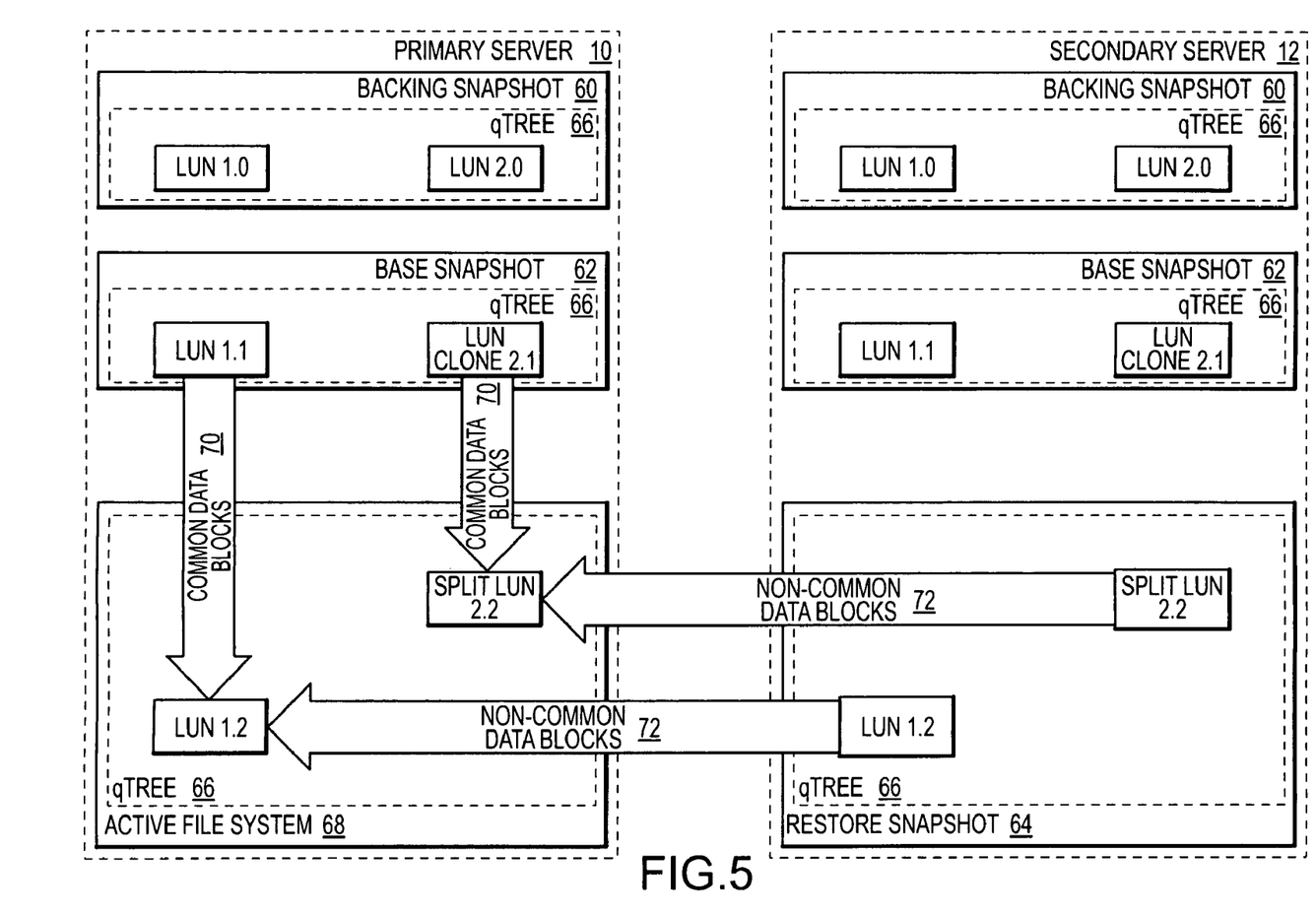
FIG. 5 is a diagrammatic illustration of a restore of a snapshot from the secondary server to the active filesystem of the primary server, shown in FIG. 2.
Figure 6:
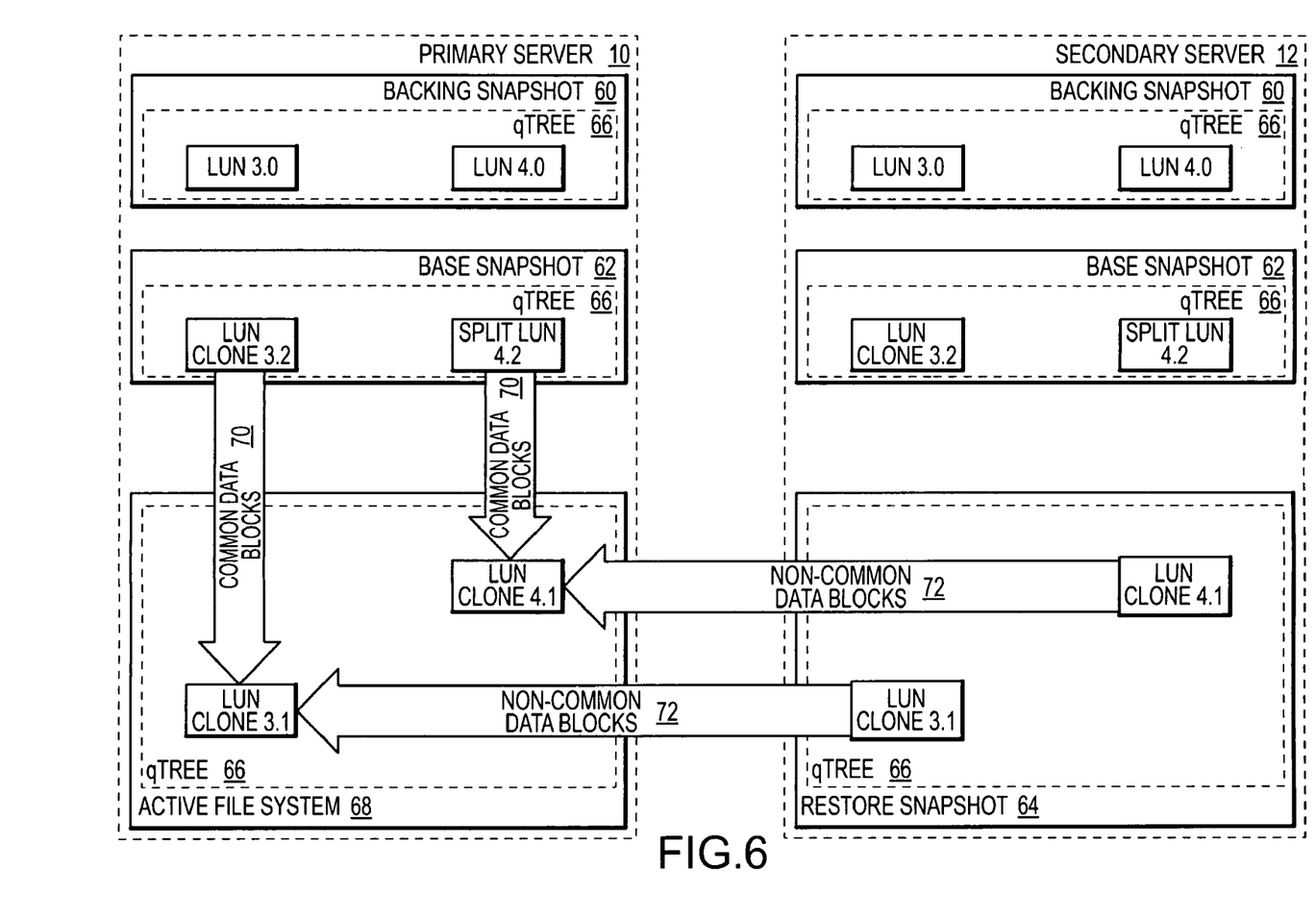
FIG. 6 is a diagrammatic illustration of a backwards in time restore of a snapshot from the secondary server to the active filesystem of the primary server, similar to FIG. 5.

A high level overview of an exemplary restore similar to that shown in FIG. 5 is shown in FIG. 6. The restore snapshot 64 shown in FIG. 6 was initially created on the primary server 10 at a point in time prior to the creation of the base snapshot 62. The lun clone 3.1 within the restore snapshot 64 is a lun clone of the lun 3.0 within the backing snapshot 60. The lun clone 3.2 in the base snapshot 62 is a version of the lun clone 3.1 at a point in time after the point in time at which the lun clone 3.1 was captured in the restore snapshot 64. The lun clone 4.1 within the restore snapshot 64 is a lun clone of the lun 4.0 within the backing snapshot 60. The split lun 4.2 within the base snapshot is a version of the lun clone 4.1 at a point in time after the lun clone 4.1 was split from its backing lun, lun 4.0.

The restore process of the restore snapshot 64 proceeds similarly as previously described for the restore scenario depicted in FIG. 5. The active filesystem 68 of the primary server 10 is rolled back with the copy of the base snapshot 62 already on the primary server 10, the differences between the base snapshot 62 and the restore snapshot 64, including the non-common data blocks 72, are transferred to the primary server 10 from the secondary server 12 and the primary server incorporates or merges those transferred differences into the active filesystem 68, resulting in the active filesystem 68 being restored to the state of the active filesystem 68 represented by the restore snapshot 64. The restore of a restore snapshot which was created at a point in time before the creation of the base snapshot used to roll back the active filesystem is referred to as a backwards in time restore. One of the possible outcomes of a backwards in time restore is the conversion of a lun, such as the split lun 4.2 to a lun clone, such as lun clone 4.1, as shown in FIG. 6.

Figure 7:
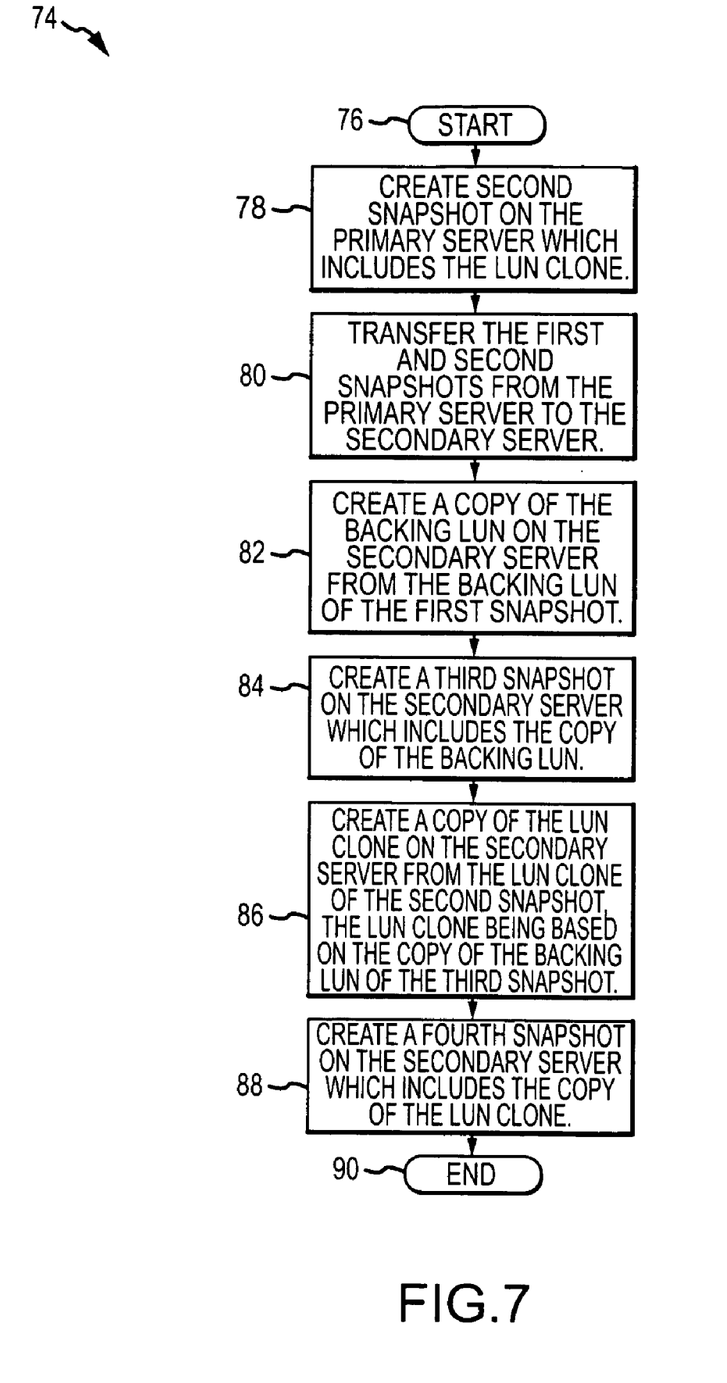
FIG. 7 is a flow chart of a process used to backup a lun and lun clone from a primary server to a secondary server, such as the servers shown in FIG. 2.
Figure 8:
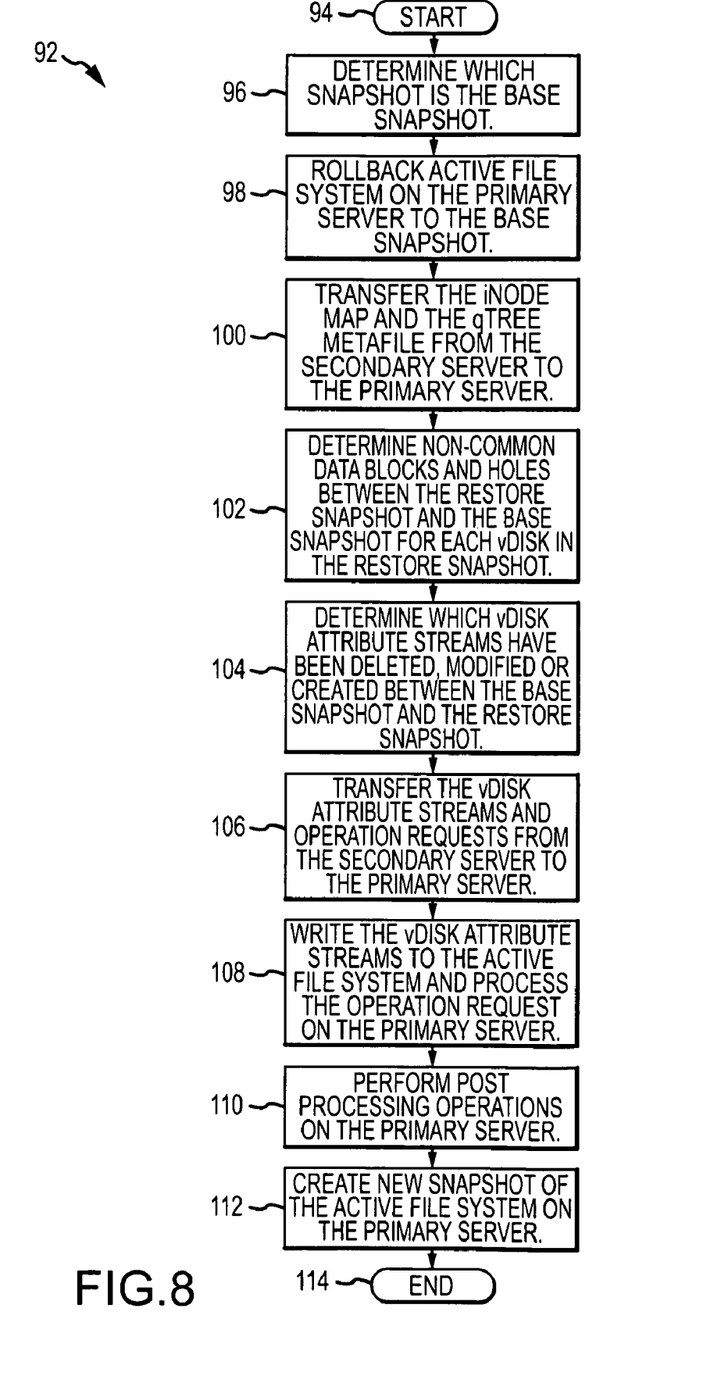
FIG. 8 is a flow chart of a process used to transfer a restore snapshot between the servers shown in FIG. 2.

Two process flows 74 and 92 for backing up a lun and lun clone and for restoring a snapshot (which may contain luns and lun clones) are shown in FIGS. 7 and 8, respectively. The process flows 74 and 92 are preferably executed by the storage operating systems 26 (FIG. 3) of the primary and secondary servers. Other embodiments of the present invention may implement the process flows in software other than a storage operating system, in hardware, in firmware or in combinations of software, hardware and firmware. Discussion below of the primary or secondary servers performing an action thus implies that the storage operating system on the primary or secondary server is performing the action.

The exemplary process flow 74 for backing up a lun and lun clone from a primary server to a secondary server starts at 76. At the point in time when the process flow 74 starts, it is assumed that a lun clone on the primary server has been created which is based off of a backing lun in a first snapshot. At 78, a second snapshot which includes the lun clone is created on the primary server.

Both the first and second snapshots are transferred to the secondary server at 80. At 82, a copy of the backing lun of the first snapshot is created in an active file system of the secondary server. At 84, a third snapshot is created on the secondary server which includes the newly created copy of the backing lun created at 82. A copy of the lun clone of the second snapshot is then created in the active file system of the secondary server, at 86. The copy of the lun clone is based on the copy of the backing snapshot of the third snapshot, which was created at 84. At 88, a fourth snapshot is created on the secondary server which includes a copy of the newly created lun clone. The process flow 74 ends at 90. The use of the exemplary process flow 90 allows a space saving relationship between a lun and a lun clone on the primary server to be duplicated on the secondary server.

Of course, a primary purpose of backing up luns and lun clones from the primary server to the secondary server is so that those luns and lun clones may be restored to the primary server at some future point in time if so desired.

The exemplary process flow 92 for restoring a restore snapshot from a secondary server to a primary server starts at 94. At 96, the primary and secondary servers determine which snapshot is the base snapshot. A base snapshot is preferably the most recent snapshot which both the primary and secondary servers currently have copies of.

At 98, the active filesystem of the primary server is rolled back to the base snapshot using the base snapshot already on the primary server. The rollback of the active filesystem using the base snapshot is accomplished using known techniques. An exemplary technique for rolling back the active filesystem of the primary server using a base snapshot already on the primary server involves: creating a temporary snapshot of the active filesystem; making the active filesystem read-only; and transferring the base snapshot to the active filesystem. The transferring of the base snapshot to the active filesystem involves determining the differences between the temporary snapshot and the base snapshot and copying those differences to the active filesystem. After the rollback the active filesystem of the primary server is in the same state as it was in when the base snapshot was created.

At 100, the inode map and the qtree metafile are transferred to the primary server from the secondary server. The primary server uses the inode map to determine which inode number and associated vdisk in the active filesystem corresponds to an inode number and associated vdisk on the secondary server. This inode number translation occurs for all inode numbers the primary server receives from the secondary server, and for the sake of reducing redundancy, is presumed to occur in the subsequent discussion for each inode number the primary server receives from the secondary server. Likewise, the primary server uses the qtree metafile to determine which snapshot on the primary server corresponds to a particular snapshot on the secondary server. This snapshot translation occurs for all snapshot ids that the primary server receives from the secondary server, and for the sake of reducing redundancy, is also presumed to occur in the subsequent discussion for each snapshot id the primary server receives from the secondary server.

The secondary server determines the differences between the vdisks in the base snapshot and the restore snapshot, at 102. For each vdisk, the secondary server determines which file offsets have data blocks or holes in the restore snapshot which are not in the base snapshot, such data blocks and holes referred to herein as non-common data blocks and non-common holes, respectively. Also, the secondary server determines which vdisks are present in the base snapshot but not the restore snapshot, such vdisks being referred to herein as missing vdisks.

At 104, the secondary server determines which vdisk attribute streams are new, deleted or have been modified between the base and restore snapshots. New vdisk attribute streams indicate that the corresponding vdisks were created in the active filesystem of the primary server between the points in time at which the base and restore snapshots were created. Modified vdisk attribute streams indicate those vdisks that changed from a lun to a lun clone or vice versa within the active filesystem of the primary server between the points in time at which the base and restore snapshots were created. Deleted vdisk attribute streams indicate those vdisks that were deleted from the active filesystem of the primary server between the points in time at which the base and restore snapshots were created.

At 106, the secondary server sends to the primary server the vdisk attribute streams for vdisks which have been identified as new or modified at 104 above. The secondary server also sends to the primary server several operation requests ("requests"). These requests fall into three basic categories: file deletions, hole punching and data block placements. The file deletion request includes a predefined instruction to delete the missing vdisks determined at 104. A separate hole punching request is sent to the primary server for each vdisk in the restore snapshot identified at 102 above. Each hole punching request includes a predefined instruction to create holes at the file offsets determined at 102 for a particular vdisk. Each data block placement request includes one or more data blocks and a predefined instruction to place the included data block(s) at the file offset(s) determined at 102 for a particular vdisk.

The vdisk attribute streams and the operation requests are sent from the secondary server and received by the primary server at 106. At 108, the primary server stores the received vdisk attribute streams in the active filesystem and updates the inode entries of the vdisks corresponding to the received vdisk attribute streams so that the appropriate metadata pointer points to each newly stored vdisk attribute stream. The primary server then processes the requests received from the secondary server. The primary server processes the file deletion request by deleting those vdisks specified within the file deletion request. The primary server processes the hole punching requests for a particular vdisk by uninitializing the data block pointers at the specified file offsets for that vdisk. The primary server processes the data block placement requests for a particular vdisk by storing in the active file system the data blocks contained in the request and then updating the data block pointers of that vdisk at the specified file offsets to point to the corresponding newly stored data blocks.

At 110, the primary server performs post processing operations. The post processing operations include lun clone updating and vdisk registration updating. The lun clone updating involves updating the backing lun and backing snapshot information in the vdisk attribute stream for vdisk attribute streams which were written to at 108 above. The backing lun information is the inode number of the backing lun, and the backing lun information is updated by translating the inode number that was previously stored in the vdisk attribute stream with the corresponding inode number from the inode map. Similarly, the backing snapshot information is updated by translating the snapshot id that was previously stored in the vdisk attribute stream with the corresponding snapshot id from the qtree metafile.

The vdisk registration updating involves updating the backing lun and backing snapshot entries for lun clones within the active filesystem as well as removing the backing lun and backing snapshot information for luns in the active filesystem that were previously lun clones in the base snapshot. The vdisk attribute streams which were determined to have been modified at 104 above are the only vdisk attribute streams which need updating since the vdisks associated with those modified vdisk attribute streams are the only vdisks which have changed from a lun to a lun clone or vice verse between the base and restore snapshots. The primary server updates the backing lun and backing snapshot entries within the vtoc for all of the modified vdisks which are lun clones with the corresponding translated backing lun and backing snapshot information read from the vdisk attribute streams. The primary server removes the backing lun and backing snapshot information from vtoc entries for all of the modified vdisks which are luns.

At 112, the primary server creates a snapshot of the active filesystem to preserve the state of the active filesystem immediately following the restore of the restore snapshot. The process flow 92 ends at 114.

The result of the process flow 92 is the incremental restore of a restore snapshot from the secondary server to the primary server. The primary benefit of performing an incremental restore is that less data needs to be transferred between the servers compared to full backups or restores. An additional benefit of the process flow 92 is that lun clones can be restored as part of an incremental restore. By replacing the vdisk attribute streams as per 108 of the process flow 92 and performing the post processing operations as per 110 of the process flow 92, the process flow 92 dynamically converts between luns and lun clones in the situation where a vdisk is of one type in the base snapshot and is of the other type in the restore snapshot. This dynamic conversion between luns and lun clones as part of a restore allows for greater flexibility in managing luns and lun clones than is the case where luns and lun clones can only be incrementally backed up or restored to the same vdisk type.

The process of performing an incremental backup from the primary server to the secondary server is similar to the process steps 102 to 112 of the process flow 92, with the direction of the transfers and server identities reversed.

The ability to backup and restore lun clones as lun clones in accordance with the present invention results in a data storage space savings on the secondary server and also requires less data to be transferred between the primary and secondary server during transfers of a lun clone. Reducing the amount of data storage space required to backup data and reducing the amount of data transferred during a backup or restore results in a cost savings since less physical data storage space and lower capacity communications networks are required than would otherwise be the case.

A presently preferred embodiment of the present invention and many of its improvements have been described with a degree of particularity. This description is a preferred example of implementing the invention, and is not necessarily intended to limit the scope of the invention. The scope of the invention is defined by the following claims.

The invention claimed is:

1. A method of transferring a backing lun (logical unit number) and a lun clone of the backing lun from a first volume of a primary server computer ("primary server") to a second volume of a secondary server computer ("secondary server"), the first and second volumes each storing data of an active filesystem and snapshots of the active filesystem of each server, the backing lun and the lun clone sharing a plurality of shared data blocks within the first volume, the backing lun and the lun clone each also including separate data blocks in the first volume which are not shared, the method comprising:
    generating the lun clone on the primary server from a first snapshot of the active filesystem of the first volume which includes the backing lun;
    creating a second snapshot of the active filesystem of the first volume which includes the shared data blocks and the separate data blocks of the lun clone;
    transferring the first and second snapshots from the primary server to the secondary server;
    creating a new backing lun in the active filesystem of the second volume from the shared data blocks and the separate data blocks of the backing lun in the transferred first snapshot;
    creating a third snapshot of the active filesystem of the second volume which includes the new backing lun;
    creating a new lun clone in the active filesystem of the second volume from the new backing lun of the third snapshot;
    updating the new lun clone with the separate data blocks of the lun clone in the transferred second snapshot; and
    wherein:
        the new lun clone and the new backing lun of the second volume share copies of the same plurality of data blocks as are shared by in backing lun and the lun clone in the first volume.

2. A method as defined in claim 1, further comprising:
    transferring the second snapshot from the primary server to the secondary server by transferring the separate data blocks of the lun clone and no other data blocks of the lun clone from the primary server to the secondary server.

3. A method as defined in claim 1, further comprising:
    creating a fourth snapshot of the active filesystem of the second volume which includes the new lun clone.

4. A method as defined in claim 3, wherein the luns and lun clones in each volume have unique inode numbers and the snapshots within each volume have unique snapshot identifiers, and the method further comprises:
    establishing a map of inode numbers of the primary luns and the primary lun clones which correlate to inode numbers of the secondary luns and the secondary lun clones;
    updating the map of inode numbers upon creating each secondary lun and secondary lun clone;
    establishing a map of snapshot identifiers of the primary server to snapshot identifiers of the secondary server for each snapshot transferred to the secondary server; and updating the map of snapshot identifiers upon creating each of the third and fourth snapshots.

5. A method as defined in claim 1, further for restoring the active filesystem of the primary server from a snapshot of the volume of the secondary server, the method further comprising:
   selecting a snapshot of the second volume of the secondary server to be restored to the first volume of the primary server, the selected snapshot designated as a restore snapshot, the restore snapshot representing the state of the active filesystem of the first volume of the primary server at a previous point in time;
   selecting a snapshot which is common to the volumes of both the primary server and the secondary server, the selected common snapshot designated as a base snapshot, the base snapshot representing the state of the active filesystem of the primary server at a different point in time from the point in time represented by the restore snapshot;
   using the base snapshot to restore the active filesystem of the first volume of the primary server to the state represented by the base snapshot;
   determining the differences between the restore snapshot and the base snapshot, the determined differences designated as snapshot difference information;
   transferring the snapshot difference information from the secondary server to the primary server; and
   restoring the active filesystem of the primary server to the state represented by the restore snapshot by modifying the state of the active filesystem of the primary server established by the base snapshot in accordance with the transferred snapshot difference information.

6. A method as defined in claim 5, wherein the snapshot difference information comprises file mapping information which correlates file identification information of the primary server with file identification information of the secondary server.

7. A method as defined in claim 6, wherein modifying the active filesystem of the primary server in accordance with the snapshot difference information further comprises:
   translating file identification information received from the secondary server to corresponding file identification information for the primary server using the transferred file mapping information.

8. A method as defined in claim 5, wherein each snapshot of the active filesystem of the primary server is created at a different point in time to represent a different state of the active filesystem of the primary server at the time of creating the snapshot, and the method further comprises:
   selecting the base snapshot as the most recent snapshot created after the restore snapshot.

9. A method as defined in the claim 8 wherein determining the differences between the restore snapshot and the base snapshot comprises:
   identifying files from the restore snapshot which are not present within the base snapshot; and
   identifying separate data blocks for files within the restore snapshot which are different from data blocks of the same file within the based snapshot at a same file offset, the file offset representing a relative position of a specific data block relative to a beginning data block of the identified file.

10. A method as defined in claim 9, wherein the active filesystem of each of the primary and secondary servers establishes metadata pointers for each file within the active filesystem, the metadata pointers are ordered for each file from a first metadata pointer to a last metadata pointer, the metadata pointers of each file are one of either initialized metadata pointers which designate particular data blocks associated with the identified file or initialized metadata pointers which do not designate particular data blocks associated with the identified file, and wherein determining the snapshot difference information further comprises:
   identifying uninitialized metadata pointers for each file from the restore snapshot which are not present at the same file offset of the corresponding file from the base snapshot.

11. A method as defined in claim 10, further comprising:
   transferring the snapshot difference information from the secondary server to the primary server by actions including:
      transferring to the primary server from the secondary server information which describes the identified files from the restore snapshot which are not present within the base snapshot;
      transferring to the primary server from the secondary server metadata information for each identified file from the restore snapshot;
      transferring to the primary server from the secondary server copies of the identified separate data blocks and the file offset information for each of the separate data blocks for files from the restore snapshot which are different from the data blocks of the corresponding file from the base snapshot; and
      transferring to the primary server from the secondary server the file offset information for the identified uninitialized metadata pointers.

12. A method as defined in claim 11, wherein modifying the state of the active filesystem of the primary server in accordance with the transferred snapshot difference information further comprises:
   deleting files in the active filesystem of the primary server corresponding to the identified files from the restore snapshot which are not identified from the selected base snapshot;
   using the transferred metadata information to establish metadata for files in the volume of the primary server;
   using the transferred data blocks and corresponding file offset information for each file from the restore snapshot which has the identified separate data blocks; and
   establishing uninitialized metadata pointers in files within the active filesystem of the primary server at the file offsets corresponding to the transferred file offset information for each file from the restore snapshot having the identified uninitialized metadata pointers.

13. A method as defined in claim 12, further comprising:
   converting luns restored to the active file system from the base snapshot into lun clones, the luns which are converted have file identification information which corresponds to lun clones from the restore snapshot;
   converting lun clones restored active file system from the base snapshot into luns of those lun clones, the lun clones which are converted have file identification information which corresponds to luns in the restore snapshot;
   establishing snapshot identification mapping information which correlates snapshot identification information on the primary server with snapshot identification information on the secondary server;
   transferring to the primary server from the secondary server the snapshot identification mapping information;
   translating snapshot identification information from the secondary server to corresponding snapshot identification information on the primary server using the transferred snapshot identification mapping information; and
updating the lun clones within the active filesystem on the primary server with information from the transferred file metadata information and the transferred snapshot identification information.

14. A computer system which backs up data from client computers in backing luns (logical unit numbers) and corresponding lun clones in data storage server computers, comprising:
a first data storage server computer having a first volume which stores data of a first active filesystem, the first data storage computer operative to create persistent point in time images of the first active filesystem designated as snapshots;
a second data storage server computer having a second volume and a second active filesystem, the second data storage computer operative to create persistent point in time images of the second active filesystem designated as snapshots;
a communications network connected to the first and second data storage computers and to the client computers over which the first and second and client computers communicated; and wherein:
the first and second data storage computers are each operative to create lun clones of backing luns which contain data blocks communicated by the client computers, the lun clones sharing the same data blocks with the backing luns at the point in time that the lun clones are created, the lun clones sharing less data blocks with the backing luns over time as the data blocks of the lun clones are modified by communication from the client computers, the first data storage computer generating a lun clone from the data blocks of the backing lun captured by a first snapshot of the first active filesystem; and
the first data storage computer backs up clones to the second data storage computer by transferring to the second data storage computer the first snapshot of the first active filesystem, the second data storage computer creates a copy of the backing lun in the second active filesystem using the data blocks in the transferred first snapshot, the second data storage computer creates a persistent point in time image of the second active filesystem designated as a snapshot which captures the backing lun copy on the second data storage computer, the first data storage computer determines which data blocks of the lun clone of the first data storage computer are not shared with the backing lun of the first data storage computer, such non-shared data blocks being designated as non-common data blocks, the first data storage computer transfers the non-common data blocks to the second data storage computer, the second data storage computer creates a lun clone copy based on the backing lun copy from the snapshot of the second active filesystem, the second data storage computer updates the lun clone copy with the transferred non-common data blocks, and the updated lun clone copy of the second data storage computer contains copies of the same data blocks as those data blocks of the lun clone on the first data storage computer.

15. A computer system as defined in claim 14, wherein:
each of the client computers writes files to and read files from at least one of the luns and lun clones of at least one of the first and second data storage computers.

16. A method of conserving data storage space on a second data storage computer which backs up data from a first data storage computer, the first and second data storage computers each storing data in luns (logical unit numbers) and clones of the luns ("lun clones") each lun and each lun clone including a plurality of data blocks, the luns and the lun clones being virtual disks for storing data by client computers, the method comprising:
creating a source lun and a corresponding source lun clone on the first data storage computer, the source lun clone sharing a plurality of data blocks with the source lun on the first data storage computer, the source lun clone created from a snapshot of the first data storage computer that includes the source lun;
creating a target lun and a corresponding, target lun done on the second data storage computer, the target lun clone sharing a plurality of data blocks with the target lun on the second data storage computer, the target lun created from the snapshot of the first data storage computer that is transferred to the second data storage computer;
transferring snapshots containing data blocks from the source lun and the source lun clone from the first data storage computer to the second data storage computer; and
backing up the data in the transferred snapshots on the second data storage computer in the target lun and the target lun clone in a manner which duplicates the same shared relationship of the data blocks in the target lun and the target lun clone as exists with respect to those same plurality of data blocks in the source lun and the source inn clone on the first data storage computer.

17. A method as defined in claim 16, wherein transferring data blocks of the source lun and corresponding source lun clone further comprises:
transferring lun-specific data which is specific to the source lun and which is not shared with the source lun clones;
transferring lun clone-specific data which is specific to the source lun clone and which is not shared with the source lun;
transferring only one copy of the data which is shared between the source lun and the source lun clone from the first data storage computer of the second data storage computer.

18. A method as defined in claim 17, for further restoring data from the target lun clone from the second data storage computer to the first data storage computer, the method further comprising:
determining the data of the target lun clone which is specific to the target lun clone;
transferring to the first data storage computer from the second data storage computer the data determined to be specific to the target lun clone;
creating a restore lun clone on the first data storage computer which includes the transferred data specific to the target lun clone, the restored lun clone based on the source lun on the first data storage computer; and
sharing between the restored lun clone and the source lun on the first data storage computer copies of the same data blocks which are shared between the target lun and the target lun clone on the second data storage computer.

* * * * *